United States Patent [19]

Ruble et al.

[11] 4,353,115

[45] Oct. 5, 1982

[54] APPARATUS FOR SYNTHESIZING A SINUSOIDAL OUTPUT

[75] Inventors: Ray Ruble, Torrance; Werner S. Treitel, Woodland Hills, both of Calif.

[73] Assignee: Litton Systems, Inc., Beverly Hills, Calif.

[21] Appl. No.: 276,275

[22] Filed: Jun. 22, 1981

Related U.S. Application Data

[63] Continuation of Ser. No. 134,828, Mar. 28, 1980, abandoned.

[51] Int. Cl.³ .............................................. H02P 13/20
[52] U.S. Cl. ........................................ 363/42; 363/97; 363/133
[58] Field of Search .................... 318/811; 363/39, 40, 363/41, 42, 95–97, 133, 25, 26

[56] References Cited

U.S. PATENT DOCUMENTS

| 3,253,228 | 5/1966 | Montner | 363/41 X |
| 3,487,288 | 12/1969 | Reid et al. | 363/41 |
| 3,742,330 | 6/1973 | Hodges et al. | 363/41 |
| 4,067,057 | 1/1978 | Taddeo et al. | 363/41 |
| 4,099,109 | 7/1978 | Abbondanti | 318/811 |
| 4,190,883 | 2/1980 | Cowett | 363/97 X |

Primary Examiner—A. D. Pellinen

[57] ABSTRACT

A sinusoidal synthesizer is shown which produces a sinusoidal AC power output from a modulated pulse train. The pulse train is modulated by two independent feedback loops which each use the sinusoidal output as its reference. The first loop controls output voltage by a high gain negative feedback signal to a pulse width modulator, while the second loop shapes the sinusoidal output by a less than unity gain, positive feedback signal to a second pulse width modulator.

19 Claims, 6 Drawing Figures

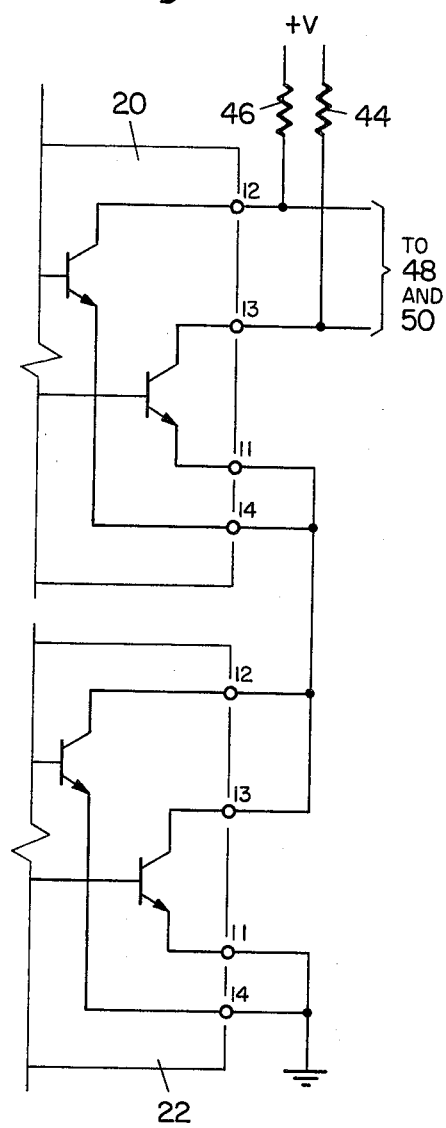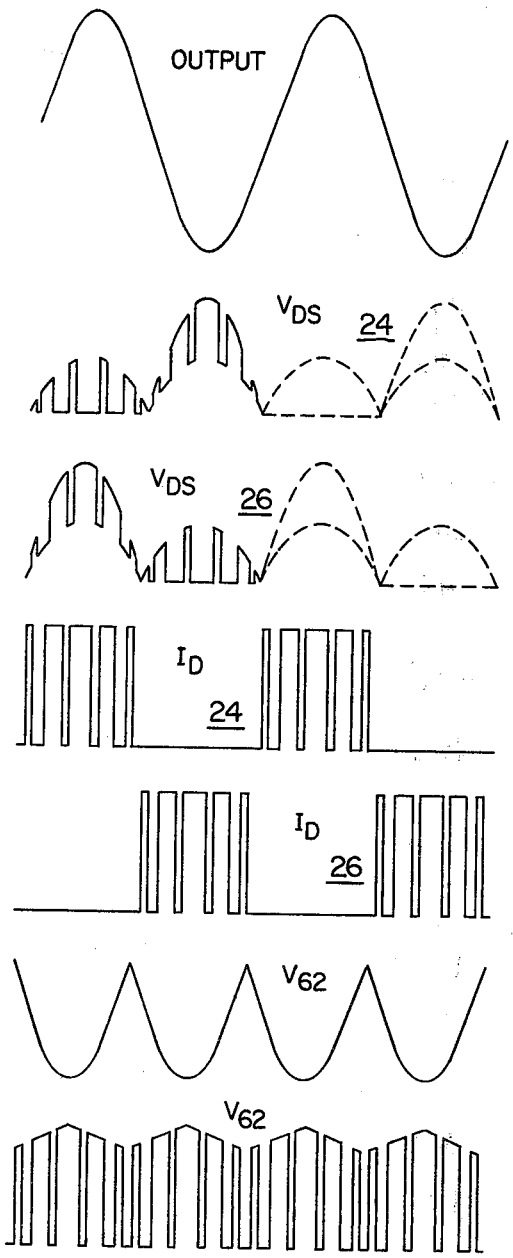

APPARATUS FOR SYNTHESIZING A SINUSOIDAL OUTPUT

This is a continuation of application Ser. No. 134,828, filed Mar. 28, 1980, now abandoned.

FIELD OF THE INVENTION

This invention relates to apparatus for synthesizing a sinusoidal output; and, more particularly, to apparatus which synthesizes a sinusoidal AC power output from a modulated pulse train utilizing two independent feedback loops to achieve good regulation and low output distortion with a minimum number of components, low volume and high efficiency.

BACKGROUND OF THE INVENTION

In the prior art, designs of power supplies with sinusoidal outputs have used one of three techniques, including: (1) oscillator/amplifier arrangements, (2) synthesis from stored data, such as a ROM, or, more recently, a minicomputer, or (3) a large resonant tank circuit.

An example of an oscillator/amplifier system for producing a sinusoidal output is shown in U.S. Pat. No. 4,067,057 which issued Jan. 3, 1978 and is entitled "DC TO AC SWITCHING CONVERTER" by F. W. Taddeo and R. W. Pauly assigned to Pacific Electronic Enterprises, Inc. This circuit, while being a relatively simple circuit, relies heavily on the elimination of transformers and thus does not function as a true AC power supply since the AC voltage peak is limited to less than the DC input. The present invention is capable of providing an AC signal which is either above or below amplitude of the input voltage. Secondly, the prior art oscillator and amplifier arrangement requires a high quality local sinusoidal oscillator as part of the circuit while output distortion is dependent on the distortion of this oscillator. The present invention does not require a sinusoidal reference as the positive feedback loop functions to shape the sinusoidal output.

An example of a sinusoidal output which synthesizes the output from stored data may be found in U.S. Pat. No. 3,487,288 which issued on Dec. 30, 1969 and is entitled "PULSE WIDTH INVERTER" by H. Reid, Jr. and J. R. Currie assigned to the United States of America. This synthesizer suffers from the drawbacks of complexity and cost which are avoided by the present invention. Modulation consists of a resistive divider chain and a series of amplifiers, six in all, functioning as comparators whose outputs are selected as required according to the count of a self-setting clock. The scheme requires a complex clock, a programmed pulse selection system, and a pulse steering network all of which the present invention avoids. Additionally, he multiple amplifiers generate but one pulse width per amplifier while the present invention can generate a multiplicity of pulse widths from a single comparator found within the pulse width modulator. Finally, the device described in this prior art patent does not provide output voltage regulation to cope with line voltage variations or variations in load current as in the present invention. The present invention accomplishes regulation through a regenerative means of sine synthesis by referencing its own output in a bootstrap approach as will be described below.

A synthesizer for creating a sinusoidal output which incorporates a minicomputer may be found in U.S. Pat. No. 4,099,109 which issued on July 4, 1978 and is entitled "DIGITAL APPARATUS FOR SYNTHESIZING PULSE WIDTH MODULATED WAVEFORMS AND DIGITAL PULSE WIDTH MODULATED CONTROL SYSTEM" by A. Abbondanti which is assigned to Westinghouse Electric Corporation. The approach described in this reference uses a digital computer to synthesize the output waveform. The present invention provides a continuous output voltage over a substantially wide range of input voltages and output loads without the use of either a digital computer described in the '109 patent or stored data as described in the '288 patent.

Finally, a prior art system which utilizes a large resonant tank circuit may be found in U.S. Pat. No. 3,742,330 which issued on June 26, 1973 and is entitled "CURRENT-MODE DC TO AC CONVERTERS" by L. O. Hodges and L. R. Suelzle which is assigned to Data Electronic Control Corporation. This arrangement does not include a feedback from the load and thus operates in a quasi-open-loop mode. The present invention uses a closed-loop feedback that eliminates the need for an expensive and cumbersome output clamp as described in the '330 patent which is required because of the open-loop mode. Further, the present invention returns all unneeded power to the input rather than dissipating it as described within the '330 patent.

The subject matter of the present invention has been discussed in a publication which was authored by the inventors of this invention entitled "A New Technique For Sine Synthesis Inverter Design" which appeared in the Proceedings Of The Sixth National Solid-State Power Conversion Conference, May, 1979, POWERCON 6, published April, 1979, by Power Concepts, Inc. at pages F4-1 through F4-7.

SUMMARY OF THE INVENTION

The present invention describes a low distortion sine wave AC power supply that can be used in airborne navigational equipment due to its minimum size and weight and its maximum efficiency. The present invention further provides a power source having low harmonic distortion and high reliability at minimum cost. Finally, the present invention combines high reliability with maximum simplicity which is accomplished through the utilization of a minimum number of parts.

The synthesizer which synthesizes a sinusoidal or AC output is designed around a pair of pulse width modulators which are connected to a pair of solid-state switches. The switches alternately connect the opposite ends of a transformer primary winding to ground while the center tap thereof is connected to a source of DC power. The secondary winding of the transformer is connected to the output terminals of the synthesizer, and a capacitor is connected across the terminals to form a low Q, LC tank which integrates and shapes the output sinusoidally to some degree. A positive, less than unity gain feedback loop is connected to one of the modulators to complete the shaping of the sinusoidal output. This feedback loop connects from a diode bridge connected across a tertiary winding of the same transformer. The bridge also connects via a negative, high gain feedback loop to the other modulator to control the output voltage.

The first pulse width modulator connected to the high gain loop is driven by an oscillator circuit that establishes a frequency which is twice the frequency of the sinusoidal output; while the second modulator connected to the less than unity gain loop is driven by an oscillator circuit which establishes the modulator frequency at a higher level. Through the feedback arrangement, the first pulse width modulator controls the amplitude of the voltage output of the synthesizer while the second pulse width modulator limits distortion of the output waveform.

The arrangement described makes it possible to provide L and C components that are much smaller than they would otherwise be. The Q of the circuit is substantially larger than the Q of the components due to the positive feedback circuit which provides a Q multiplier for the circuit itself. The result, despite the tank circuit having a reduced Q, provides a total harmonic distortion of less than 3% with input line variations of 2 to 1 while load variations may vary from 10 to 1. The total number of components within the circuit is low, while the requirement for quality components is also reduced. The system efficiency runs close to 90% at full load. Thus, the overall objectives of the present invention of providing a minimum size and weight at maximum efficiency have been met.

BRIEF DESCRIPTION OF THE DRAWINGS

FIG. 3 is a schematic showing in detail the connection of the pulse width modulators;

FIG. 6 illustrates input and output waveforms of the switching devices.

DETAILED DESCRIPTION OF THE PREFERRED EMBODIMENT

Figure 1:
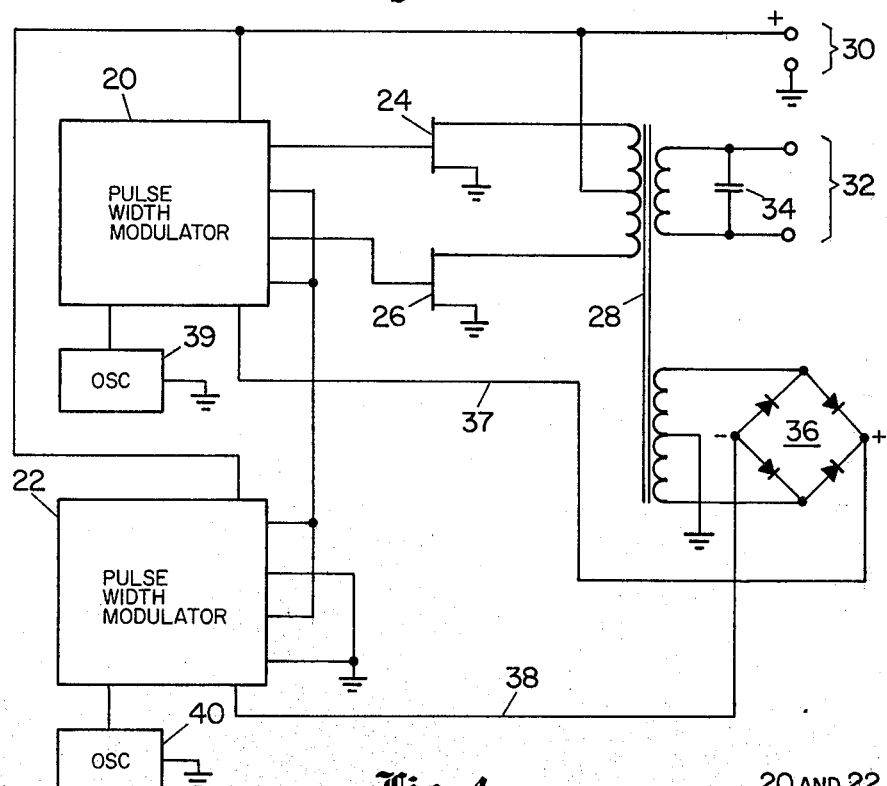
FIG. 1 is a schematic diagram showing the synthesizer circuit of the present invention.

FIG. 1 illustrates the sinusoidal synthesizer of the present invention which includes a first pulse width modulator 20 and a second pulse width modulator 22. The integrated circuits (ICs) which form the modulators may be purchased from various manufactureres including Silicon General, Part Number SG1524; National Semiconductor, Part Number LM1524; or Texas Instrument. It has been found that these ICs have no difficulty in responding to almost any AC signal superimposed on their feedback reference line. This capability has been used to apply an AC feedback signal to the pulse width modulators. It was determined after some experimentation that the output of the synthesizer itself would serve as the AC feedback signal in a bootstrap arrangement.

That is, in the present invention, the pulse width modulated signal from the first modulator 20 is applied to the gates of a pair of field-effect transistor (FET) power switches 24 and 26 whose source is connected to ground. The drains of each of the FET switches 24 and 26 connect to the opposite ends of a primary winding of a transformer 28. The center tap of the primary winding is connected to the positive terminal of a DC voltage source 30 which, typically, may vary between 18 and 36 volts DC. The DC signal also powers the modulators 20 and 22. A secondary winding of transformer 28 connects to output terminals 32 which receive the sinusoidal output signal. Connected across terminals 32 is a tank capacitor 34 which, in combination with the secondary winding of transformer 28, forms an LC tank circuit. A tertiary winding within transformer 28 is attached to a bridge rectifier formed from four diodes 36. Attached to the positive terminal formed by the diode bridge is a negative feedback loop 37 which connects to modulator 20 and controls the output voltage amplitude across the terminals 32 as will be described below. Attached to the negative terminal of the bridge formed by diodes 36 is a positive, less than unity gain feedback loop 38 connected to modulator 22 to control the shape of the sine wave. The output frequency of pulse width modulator 20 is established by an oscillator 39 typically formed within the IC of the modulator 20 and an RC network connected at the input thereof. This frequency is established, within the preferred embodiment, at twice the output frequency. In a similar manner, the frequency of the output of the pulse width modulator 22 is controlled by an oscillator 40 typically in modulator 22 in combination with an RC circuit at the input thereof which establishes the output feedback frequency of modulator 22. The output of frequency of modulator 22 is not critical in the preferred embodiment. Any frequency will do provided its ratio is 3 or more to 1 greater than the frequency of modulator 20.

Figure 2:
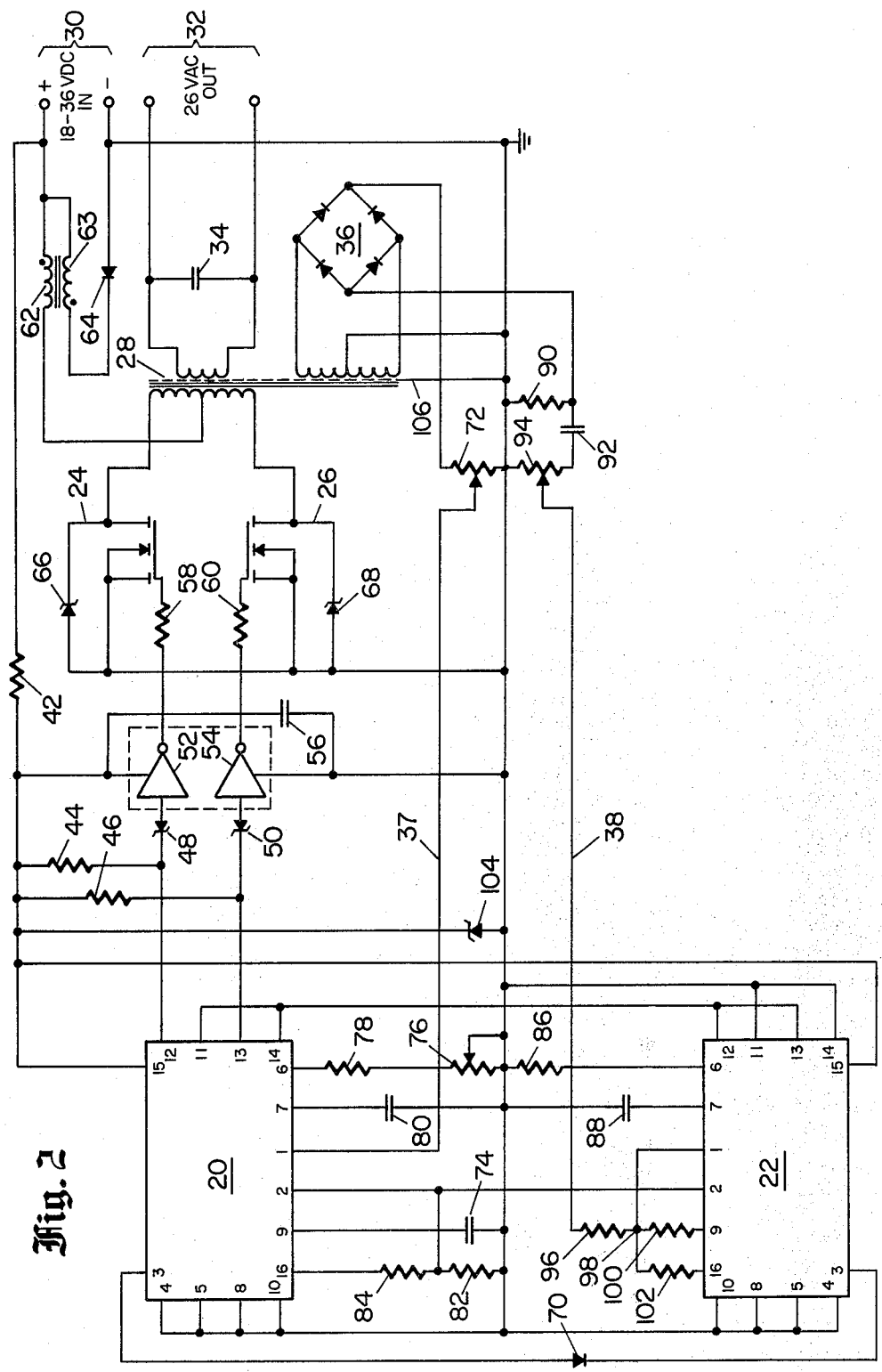
FIG. 2 is a more detailed schematic diagram showing the synthesizer.

Referring now to FIG. 2, the sinusoidal synthesizer will be described in detail. When commercially available IC circuits of SG 1524 type are used, two pulse width modulators 20 and 22 typically each include an IC chip in the form of a 16-pin dual-in-line package wherein each terminal or pin is numbered 1 through 16, as shown in FIG. 2. Pin 8 or substrate ground is connected to system ground as are pins 4, 5 and 10 to eliminate the functions associated with these pins in each of the commercially available IC modulators 20 and 22.

The positive terminal of the DC source 30 is connected via a resistor 42 to the voltage input terminal 15 of each modulator 20 and 22. The power applied to terminal 15 is also applied through a pair of power reducing resistors 44 and 46 to the collector terminals 12 and 13 of two NPN transistors found within the modulator 20, as best seen in FIG. 3. The emitters connected to terminals 11 and 14 are then tied together and connected to the collectors at terminals 12 and 13 of the NPN transistors found within the modulator 22. The emitter terminals of the transistors within modulator 22 are connected via terminals 11 and 14 to system ground. While the interconnection between the transistors of the two modulators 20 and 22 is best seen in FIG. 3, the schematic of each pulse width modulator 20 and 22 is shown in detail in FIG. 4. The functions of those components within the IC which are not utilized within the present invention have been deleted.

The collectors of the NPN transistors found within the modulator 20 are connected via the cathode terminals of zener diodes 48 and 50 whose anodes are connected to the input terminal of inverters 52 and 54 which act as FET drivers. In the preferred embodiment, the two inverters 52 and 54 may be found upon a single IC chip. Each inverter is powered by the same voltage level applied to terminal 15 of the modulator 20 as shown by the dashed lines enclosing them. A capacitor 56 is connected between the two inverters 52 and 54 to prevent switching noise from passing into the circuit. The outputs of inverters 52 and 54 are applied through resistors 58 and 60 to the gates of FET switches 24 and 26. The FET switches in the present embodiment are N-channel enhancement type metal-oxide-semiconductor field-effect transisters (MOSFET) although P-channel devices will work as well once they become more commercially available. Bipolar transistors have been used and work well in this application by using a revised drive scheme. It will be seen that the zener diodes 48 and 50 provide input signal scaling for the FET inverter drivers 52 and 54 while resistors 58 and 60 prevent spurious resonance within the drive circuit.

The drain of FET switch 24 connects to one end terminal of the primary winding of transformers 28 while the drain of FET switch 26 is attached to the other end terminal. The center tap of the primary winding is connected to the positive input terminal 30 of the DC source via an input inductor 62. The input inductor 62 includes an iron core having a second discharge winding 63 which connects the positive terminal 30 of the DC power supply to the cathode of a steering diode 64 whose anode is then connected to negative terminal 30. The input inductor 62 functions to protect the circuit, especially the FET switches, from power transients and to reduce harmonic distortion therein. The input inductor also forces the drain voltage waveform to be in the form of the synthesized sine wave, FIG. 6, while the drain current waveform is essentially a square wave composed of periodically modulated square current pulses. The discharge winding 63, along with the diode 64, serves to return the energy stored in the inductor at the end of each modulating pulse to the input line. This feature permits the power stage to be pulse width modulated as in a conventional current-fed inverter, without over-voltaging the power switches, and it increases system efficiency.

The closing of FET switches 24 and 26 connects the primary winding of transformer 28 to ground. This permits the alternate charging and discharging of capacitor 34 which, in combination with the tuned secondary winding of transformer 28 acts as a tank circuit which partially shapes the output waveform. A pair of zener diodes 66 and 68 are connected between the source and drain of each FET switch 24 and 26 to provide transient suppression. Resistors 58 and 60, prevent gate resonance.

Figure 5:
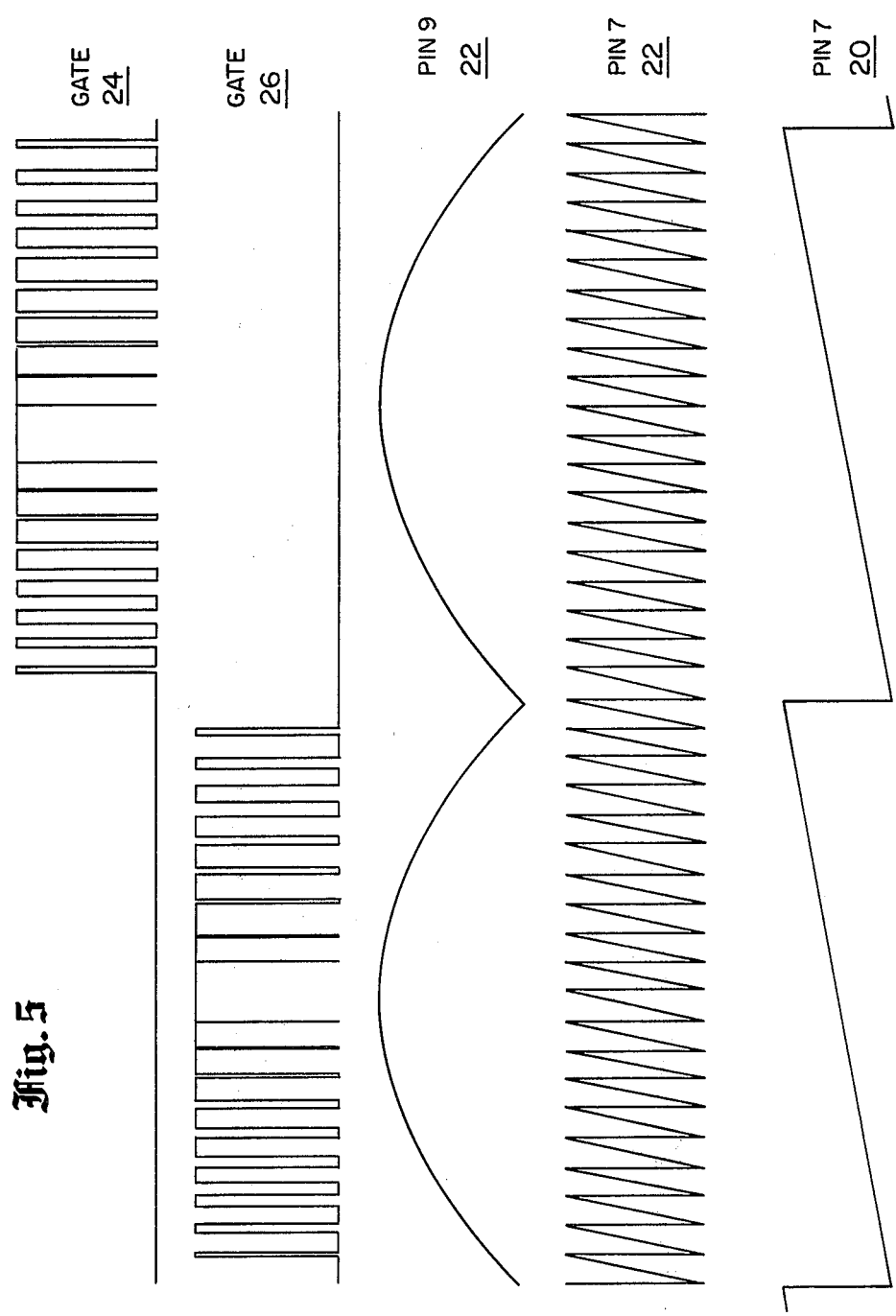
FIG. 5 illustrates input and output waveforms of the pulse width modulators.

As the pulse width modulators 20 and 22 drive the switches 24 and 26, the input from collector 12 is 180 degrees out of phase with the input from collector 13 of modulator 20. This is best illustrated in FIG. 5 wherein the pulses applied to the gates 24 and 26 are shown. The creation of these pulses by feedback loops 37 and 38 through modulators 20 and 22 will be described below. It should be noted here however, that the frequency of the second modulator 22 is much greater than the frequency of modulator 20. Through this arrangement, the frequency of modulator 20 controls the voltage amplitude, and the frequency of modulator 22 is utilized to configure the output waveform thus reducing distortion. To prevent the loss of power at zero crossing, a diode 70 is connected from the oscillator terminal, pin 3, of the modulator 20 to the oscillator terminal, pin 3, of the modulator 22 which provides a blanking pulse to modulator 22.

The two feedback loops 37 and 38, which form the heart of the present invention in combination with the two pulse width modulators 20 and 22 and the two FET switches 24 and 26, are powered by the bridge circuit formed by diodes 36. The positive terminal of the bridge circuit is connected to a fixed terminal of a potentiometer 72 whose second fixed terminal is connected to system ground. The wiper terminal of potentiometer 72 is connected to pin 1 of modulator 20 which feeds the inverting input (see FIG. 4). Pin 1 connects through an error amplifier in modulator 20 to pin 9 which connects to ground via a capacitor 74. The error feedback signal is a full-wave rectified, unfiltered sinusoid, which is integrated by the capacitor 74. This same capacitor provides soft starting for the system which results in a simple circuit with near optimum band width that affords very good regulation. The frequency of the modulator 20, and thus the output of the high gain negative loop 37, is adjustably established by a potentiometer 76 and resistor 78 serially connected to the input terminal 6 of the oscillator within modulator 20. The second input terminal 7 to the oscillator is connected to ground via capacitor 80. The combination of resistors 76 and 78 and capacitor 80 determines the frequency of the modulator 20 which appears at pin 7 (see FIG. 5).

A voltage divider formed by resistos 82 and 84 is connected from the voltage reference pin 16 of modulator 20 to ground, and the second input terminal 2 of the error amplifier of each modulator 20 and 22 is connected between resistors 82 and 84 to establish a reference signal.

As in the modulator 20, the output frequency of the modulator 22 connected to the less than unity gain, positive feedback loop 38 is established by a resistor and capacitor 86 and 88, respectively, connected between pins 6 and 7 of the modulator 22 and ground. The frequency of the second pulse width modulator 22 appears at pin 7 (see FIG. 5). The positive, less than unity gain feedback loop 38 which drives the modulator 22 is established by a connection at the negative terminal of the bridge formed by diodes 36. This negative terminal is connected to ground via a resistor 90 and also connected via a capacitor 92 to a fixed terminal of a potentiometer 94 whose second fixed terminal is connected to ground. The wiper terminal of potentiometer 94 connects via a resistor 96 to a summing junction 98 of an operational amplifier formed by the error amplifier within modulator 22 wherein pin 1 is connected to the summing junction 98 and pin 2 is connected to a reference potential as described above. The feedback loop from the error amplifier connects via pin 9 and a resistor 100 to the summing junction 98.

The operational amplifier thus formed by the error amplifier within modulator 22 and resistors 96 and 100 has a gain somewhat less than unity. The reason for this less than unity gain is that the feedback loop provides a positive feedback. If the gain were unity or more the loop would cause system oscillation. Optimum wave shaping occurs when the gain is unity. The best compromise, therefore, is to operate with a total loop gain of 0.9 to 0.95. An additional input to the summing junction 98 is provided by a DC level established through a resistor 102 from the reference voltage terminal 16 of oscillator 22 which aids starting.

A zener diode 104 connects the positive input terminal 30 via resistor 42 to ground to provide system protection and complete the circuit.

Figure 4:
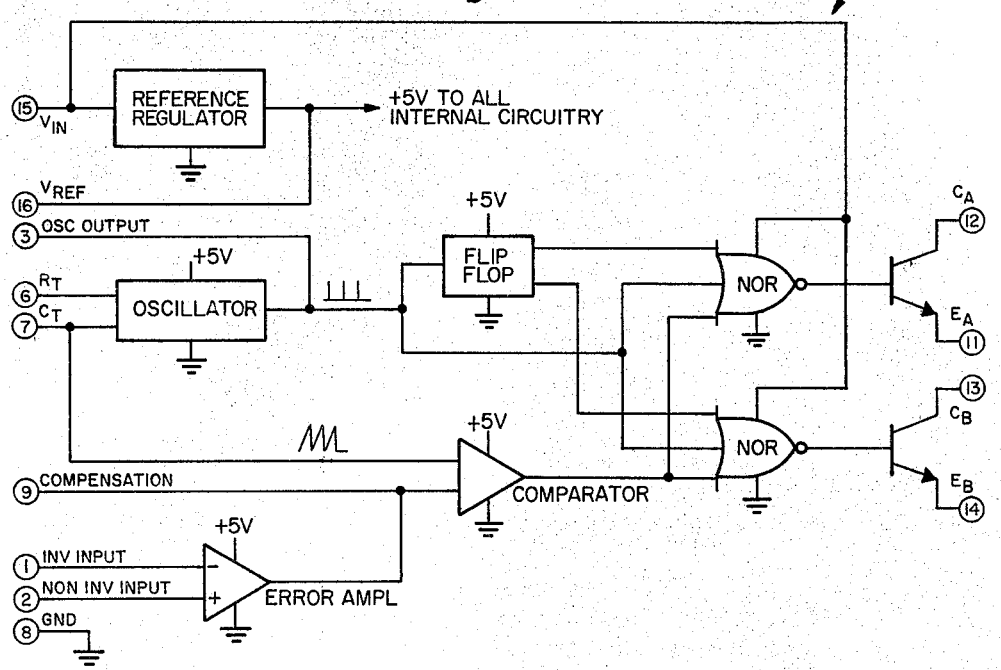
FIG. 4 is a detailed schematic of a single pulse width modulator.

Before describing the operation of the circuit in further detail, reference should be made to FIG. 4. As described above, the circuit shown in FIG. 4 is the internal circuitry of an IC which is commercially available. The circuit is shown here simply to complete the description of the preferred embodiment. The detailed circuit has not been described with reference numbers. Instead, the diagram shown in FIG. 4 includes the references utilized throughout the description hereinabove.

The electrical requirements for the magnetics of the system deserve some attention. The transformer 28 must accept high frequency pulses from the switches 24 and 26 and yet operate at low frequency. As the pulses arrive in trains on each side of the primary winding, rather than in side-to-side alteration, the core must have a large volt-second constant to accommodate such a series without saturation. The first of the two secondary windings must be slightly oversized to account for the tank currents as well as the load currents; but, due to the low Q of the output tank, these currents are not as serious as they otherwise might be. Due to the high frequency wave-fronts on the primary, the primary winding is shielded and connected to ground at 106. In practice a 48% nickel C-core and a molypermalloy toroid for the transformer 28 and coupled inductors 62 and 63 have each worked successfully.

The values of the various electrical components or the manufacturer's number are set forth hereinbelow:

| Reference No. | Mfg's No. or Value |
| --- | --- |
| 20 | SG1524 |
| 22 | SG1524 |
| 24 | VN1209 |
| 26 | VN1209 |
| 34 | 12μF |
| 36 | 1N4150 |
| 42 | 150 ohms |
| 44 | 820 ohms |
| 46 | 820 ohms |
| 48 | 5.1V |
| 50 | 5.1V |
| 52 | DS0026 (half) |
| 54 | DS0026 (half) |
| 56 | 1.0μF |
| 58 | 47 ohms |
| 60 | 47 ohms |
| 64 | 1N6081 |
| 66 | 82V |
| 68 | 82V |
| 70 | 1N4150 |
| 72 | 50K ohms |
| 74 | .22μF |
| 76 | 10K ohms |
| 78 | 30.1K ohms |
| 80 | .05μF |
| 82 | 27K ohms |
| 84 | 22K ohms |
| 86 | 2K ohms |
| 88 | .001μF |
| 90 | 10K ohms |
| 92 | 1μF |
| 94 | 50K ohms |
| 96 | 110K ohms |
| 100 | 100K ohms |
| 102 | 150K ohms |
| 104 | 12V |

In operation, the system is started when DC power is applied across terminals 30. Power is delivered, via resistor 42, to the pulse width modulators 20 and 22, and to the drivers 52 and 54. The internal circuitry of the pulse width modulator is started to switch on one output transistor in each modulator. One of the two drivers 52 or 54 turns on one of the power switches 24 or 26, thus initiating current flow in the transformer 28 primary. Until this time no output has been present. Both pulse width modulators program the system for maximum pulse width, but pulse width modulator 20 is initially constrained from calling for maximum pulse width by the uncharged capacitor 74, attached to pin 9 thereof. This causes a proportional startup delay or "soft start" of the system, as this capacitor 74 charges from the high impedance presented by pin 9 of pulse width modulator 20.

When current starts flowing in the primary of transformer 28, due to conduction of either transistor switch 24 or 26, the current is reflected into the secondary and tertiary windings. The controlled inductance of the secondary winding to which the capacitor 34 is connected, reacts with that capacitor and resonates with it, partially shaping the output away from the square wave it would otherwise be, and toward the sinewave which it will become. This action also reflects to the tertiary winding from which the feedback is taken; and results in this altered squarewave propagating back through the positive feedback loop 38, comprised of the diode bridge 36, load resistor 90, inversion capacitor 92, feedback trim potentiometer 94 and scaling resistor 96 into pin 1 of pulse width modulator 22, where it is amplified by the error amplifier therein, and used as a reference for further modulation of the width of the pulses delivered to switches 24 and 26. The effect of this positive feedback on the modulation is regenerative, or self-reinforcing, and very rapidly forms the output into the desired sinewave shape.

In a similar manner, the negative feedback loop 37, comprised of the bridge 36 and feedback trim potentiometer 72 into pin 1 of pulse width modulator 20, is used to apply the altered squarewave signal to the error amplifier where it is used as a reference for further modulation of the width of the group or train of on pulses delivered to switches 24 and 26. This negative, high gain feedback loop controls the voltage output of the final output signal shown in FIG. 6.

As described above, the FET switches may be either N-channel or P-channel devices. Further, while the present switches are MOSFETs, it will be understood that bipolar transistors may also be used for implementing the power switching. Other modifications and variations will become apparent to those skilled in the art after review of the foregoing.

Having thus described a preferred embodiment of the invention, we claim:

1. Apparatus for synthesizing a sinusoidal output, comprising:

first and second switching means;

transformer means having a primary winding with a center tap and first and second input terminals at the opposite ends thereof, and secondary and tertiary windings, said secondary winding have third and fourth output terminals at the opposite ends thereof;

capacitance means connected across said output terminals;

rectification means connected across said tertiary winding;

a source of power connected to the center tap of said primary winding, thence to said first and second switching means via said opposite ends of said primary winding and thence to ground to establish a sinusoidal signal across said output terminals due to the resonance of said secondary winding and said capacitance means;

first and second pulse width modulators;

a less than unity gain, positive feedback loop circuit connected from said rectification means to said second pulse width modulator and thence to said first pulse width modulator; and a high gain, negative feedback loop circuit connected from said rectification means to said first pulse width modulator to control said first and second switching means and thereby provide feedback control of the sinusoidal output voltage amplitude across said output terminals by using said sinusoidal voltage output as its own reference signal, and the shape of said sinusoidal output across said output terminals being controlled by said positive feedback loop which controls said second modulator and said first and second switches through said first modulator.

2. Apparatus for synthesizing a sinusoidal output, as claimed in claim 1, wherein:
said first pulse width modulator includes an oscillator tuned to a low frequency by an RC circuit; and
said second pulse width modulator includes an oscillator tuned to a higher frequency by an RC circuit whose frequency is at least three times greater than said low frequency wherein said low frequency, as modified by said high gain negative feedback loop, controls the voltage output, and said high frequency, as modified by said less than unity gain, positive feedback controls the shape of said output voltage.

3. Apparatus for synthesizing a sinusoidal output, as claimed in claim 1, additionally comprising:
an input inductor connected between said source of power and said center tap on said transformer primary winding;
a second inductor coupled to said input inductor and connected to said source of power; and
diode means having its anode connected to ground and its cathode connected to said second inductor whereby unused power from said source of power is stored within said second inductor and returned to said source to improve the efficiency of said apparatus.

4. Apparatus for synthesizing a sinusoidal output, as claimed in claim 1, wherein:
said secondary winding and said capacitance means are connected in a resonant LC tank circuit to integrate the pulse train from said first and second switching means.

5. Apparatus for synthesizing a sinusoidal output, as claimed in claim 1, wherein:
said first and second switching means are N-channel metal-oxide-semiconductor field-effect transistor switches.

6. Apparatus for synthesizing a sinusoidal output, as claimed in claim 1, wherein:
said first and second switching means are P-channel metal-oxide-semiconductor field-effect transistor switches.

7. Apparatus for synthesizing a sinusoidal output, as claimed in claim 1, wherein:
said first and second switching means are bipolar transistor switches.

8. Apparatus for synthesizing a sinusoidal output, as claimed in claim 1, wherein said first and second switching means each additionally comprise:
zener diode means, inverter means, and resistive means serially connected to the gate terminal of an FET switch whose drain terminal connects to said end terminal of said primary winding and whose source terminal connects to ground; and
zener diode means connected between said drain and source terminal for transient suppression.

9. Apparatus for synthesizing a sinusoidal output as claimed in claim 1, additionally comprising:
resistive means;
amplifier means having an inverter input terminal; and
said high gain, negative feedback loop is connected from a positive terminal of said rectification means through said resistive means to said inverter input terminal of said amplifier means to create said negative feedback.

10. Apparatus for synthesizing a sinusoidal output as claimed in claim 1, additionally comprising:
first and second resistive means and capacitive means connected in a pi configuration wherein said first and second resistive means respectively connect each side of said capacitive means to ground;
third and fourth resistive means serially connected to form a midpoint;
amplifier means having an inverter input terminal and an output terminal;
said less than unity gain, positive feedback loop connected from a negative terminal of said rectification means to one side of said capacitive means whose other side connects to one end of said serially connected third and fourth resistive means having said midpoint connected to said inverter input terminal of said amplifier means to create said positive feedback; and
a second end of said serially connected third and fourth resistive means connected to said output terminal of said amplifier means to complete said positive feedback loop.

11. Apparatus as recited in claim 1 in which said rectification means is a bridge rectifier means.

12. A sine wave synthesizer, comprising:
transformer means having primary, secondary and tertiary windings;
capacitor means connected across said secondary winding to form an output circuit;
rectification means connected across said tertiary winding to generate a feedback signal;
pulse width modulating means;
switch means connecting said pulse width modulating means to said primary winding;
a high gain feedback loop circuit connected from said rectification means to said pulse width modulating means wherein the width of the pulse controlled by said high gain feedback loop circuit establishes the amplitude of a sine wave output voltage at said output circuit;
a less than unity gain feedback loop circuit connected from said rectification means to said pulse width modulating means wherein the width of the pulse controlled by said less than unity gain feedback loop shapes said sine wave output voltage established by said high gain feedback loop.

13. A sine wave synthesizer as claimed in claim 12, wherein:
said pulse width modulating means includes a pair of first and second pulse width modulators,
said switch means includes a pair of switches, and
said pair of modulators drive said pair of switches 180 degrees out of phase.

14. A sine wave synthesizer as claimed in claim 13, wherein:
said first pulse width modulator is driven at a first modulator frequency equal to twice the frequency of the sine wave output signal, and said second pulse width modulator is driven at a second modulator frequency at least three times greater than said first modulator frequency.

15. A sine wave synthesizer as claimed in claim 14, wherein:
said high gain feedback loop is a negative loop modulated by said first pulse width modulator at said first modulator frequency,
said less than unity feedback loop is a positive loop modulated by said second pulse width modulator at said second modulator frequency,
said first pulse width modulator has a pair of first and second output terminal;
said second pulse width modulator has an output connected to drive said first pulse width modulator wherein the output at said first output terminal of said first pulse width modulator is a pulse train signal whose train width is controlled by said negative, high gain feedback loop and whose individual pulse width is controlled by said positive, less than unity gain feedback loop and wherein the output at said second output terminal of said first pulse width modulator is a pulse train the same as said first output but 180 degrees out of phase therefrom.

16. A sine wave synthesizer as claimed in claim 13, additionally comprising:
said primary winding having a center tap,
a voltage source connected to said center tap, and
said pair of switch means each connecting one end of said primary to ground wherein a current is caused to flow first in one direction within said secondary winding and then in the other direction to place an alternating charge upon said capacitor means.

17. A sine wave synthesizer as claimed in claim 16, additionally comprising:
inductor means connecting said voltage source to said center tap,
discharge means coupled to said inductor means, and
diode means blocking the discharge of said discharge means to ground, wherein voltage unused by said sine wave synthesizer is returned to said voltage source to increase efficiency.

18. A sine wave synthesizer, as claimed in claim 13 additionally comprising:
diode means connected from said first pulse width modulator to said second modulator to blank said second modulator as said first modulator crosses zero.

19. Apparatus as recited in claim 11 in which said rectification means is a bridge rectifier means.

* * * * *